United States Patent [19]
Schmidt et al.

[11] 4,432,237
[45] Feb. 21, 1984

[54] ULTRASONIC TRANSDUCER

[75] Inventors: Dieter Schmidt; Rolf Engler, both of Göttingen, Fed. Rep. of Germany

[73] Assignee: Deutsche Forschungs-und Versuchsanstalt für Luft-und Raumfahrt e.V., Cologne, Fed. Rep. of Germany

[21] Appl. No.: 342,085

[22] Filed: Jan. 25, 1982

[30] Foreign Application Priority Data

Jan. 31, 1981 [DE] Fed. Rep. of Germany ....... 3103357

[51] Int. Cl.³ ............................................. G01N 29/00
[52] U.S. Cl. ........................................ 73/632; 73/147; 310/800
[58] Field of Search ................. 73/632, 644, 625, 626, 73/147; 310/334, 335, 336, 800, 11

[56] References Cited
U.S. PATENT DOCUMENTS 3,935,485  1/1976  Yoshida et al. ..................... 310/800

Primary Examiner—Stephen A. Kreitman
Attorney, Agent, or Firm—Max Fogiel

[57] ABSTRACT

Ultrasonic transducers, of an electrical capacitor formed of a counter-electrode and a synthetic material film lying thereon, held by a clamping ring and metallized on one side, are used amongst other things for running time measurements in flow field examinations in wind tunnels. It is in that case important to disturb the flow as little as possible by the spatial dimensions of the ultrasonic transducer and by the necessary mountings and current feeds. For the solution of the problem, it is proposed to fasten the counter-electrode (2) and the clamping ring (3) holding the synthetic material film (5) electrically insulated therefrom on a conductor plate (6) and electrically conductively to connect each with a respective conductor track portion (7, 8 or 7, 10, 8, 9).

12 Claims, 5 Drawing Figures

ULTRASONIC TRANSDUCER

BACKGROUND OF THE INVENTION

The invention concerns an ultrasonic transducer in the shape of an electrical capacitor formed of a counter-electrode and a film lying thereon, of synthetic material, metallised on one side and held by a clamping ring.

Such ultrasonic transducers are known and are very frequently used for running time measurements in flow field examinations in wind tunnels. They display a relatively large housing and require extensive mountings and special current feeds. The appreciable spatial extent of such an ultrasonic transducer and the associated auxiliary equipments frequently leads to disturbances in the wind tunnel, which make the measurement results unusuable. Beyond that, for the measurement of a flow field, several successive measurements must be performed, between which the ultrasonic transducer must be displaced. In this manner, merely stationary flows or such non-stationary processes let themselves be examined, in which the measurement operation can always be triggered at the respectively correct instant due to knowledge of the expected temporal course of the flow process (for example in the special case of periodicity). In that case, relatively long measuring times must be accepted. The possibilities of application of such an ultrasonic transducer are accordingly greatly restricted to special cases.

SUMMARY OF THE INVENTION

It is the task of the invention to eliminate the mentioned defects and to create an ultrasonic transducer, the spatial dimensions of which are so small that at most negligible disturbances arise in the wind tunnel and which requires no extensive mountings and current feeds and which is so constructed that several ultrasonic transducers can be used simultaneously one beside the other, which in that case do not mutually obstruct and at the same time make possible simultaneous measurements in one flow field.

This is attained according to the invention thereby, that the counter electrode and the clamping ring holding the synthetic material film are fastened electrically insulated from each other on a conductor plate and electrically connected conductively with a respective conductor track portion provided on this. Such a construction of the ultrasonic transducer permits smallest dimensions, while at the same time a special housing can be dispensed with, since this is here formed by the clamping ring and the conductor plate. The conductor plate in that case at the same time takes over the function of a mounting and that of the current supply. Complicated mountings and wirings are therefore no longer required. Beyond that, special insulating bodies separating the counter electrode from the housing can be dispensed with. Disturbing magnitudes, such as the housing capacitance, are reduced to a minimum by the dimensions and the special arrangement of the individual parts.

The counter electrode can be constructed in disc shape and lie flatly on the conductor plate, whereby the dimensions of the ultrasonic transducer can be reduced further.

It can beyond that be formed of synthetic material and display electrically conductive zones at least at the surface. Thereby, it lets itself be produced in narrow tolerances cheaply with smallest dimensions, wherein the electrically conductive zones can for example be produced in simple manner through a metal evaporation. Beyond that, the counter electrode can be adjustable by means of screws sitting in the conductor plate so that the film of synthetic material lets itself be pre-stressed or further stressed in case of need.

The clamping ring can be detachably connected with the conductor plate and the film of synthetic material in that case be exchangeable. The film thus lets itself be exchanged easily in the case of a damage.

The conductor plate can be built up in several layers and the conductor track portions can be arranged in different planes on and within the conductor plate, whereby a particularly space-saving construction is possible. It can be constructed to be flexible and bendable so that it lets itself be applied easily also to curved surfaces.

Several ultrasonic transducers, each with their own conductor track portions for current supply, can be arranged on the conductor plate. In this manner, whole rows or fields of ultrasonic transducers let themselves be built up without additional mountings being required in that case. With such an arrangement, simultaneous measurements in a flow field can be performed, for which also rapidly devolving no-stationary processes can be detected. The ultrasonic transducers are in that case advantageously connected together into groups on the conductor plate. A complicated, expensive wiring is not required. The conductor track portions of mutually adjacent ultrasonic tranducers are in that case expediently not conducted beside one another so mutual influencing and interferences are not possible.

BRIEF DESCRIPTION OF THE DRAWINGS

An example of embodiment of the invention is explained in detail in the following description with reference to the attached drawings. In that case, there show.

DESCRIPTION OF THE PREFERRED EMBODIMENTS

Figure 1:
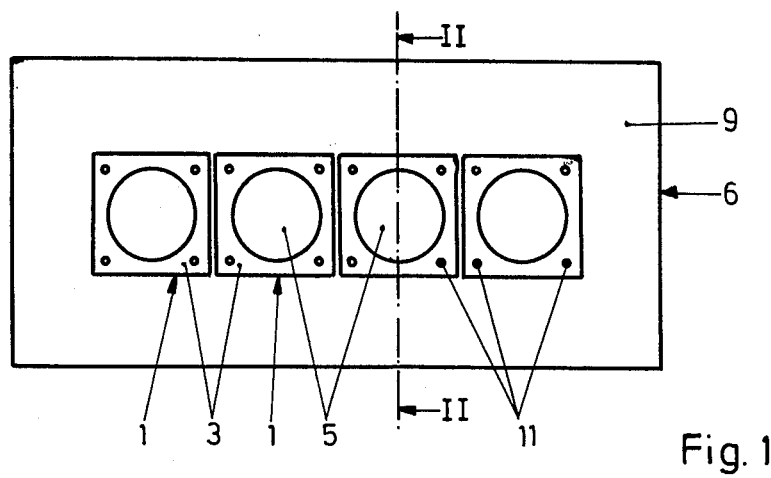
FIG. 1 a plan view on to four ultrasonic transducers arranged one beside the other on a conductor plate, FIG. 2 a section along the line II—II in FIG. 1, FIG. 3 a plan view on to the conductor plate according to FIG. 1, FIG. 4 an elevation on to the conductor plate from below and FIG. 5 a plan view on to another arrangement of the ultrasonic tranducers.
Figure 2:
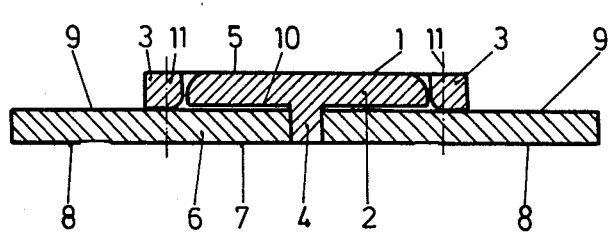
Figure 3:
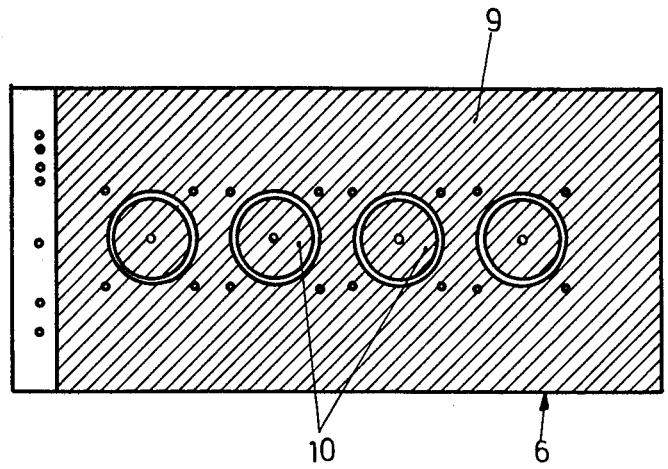
Figure 4:
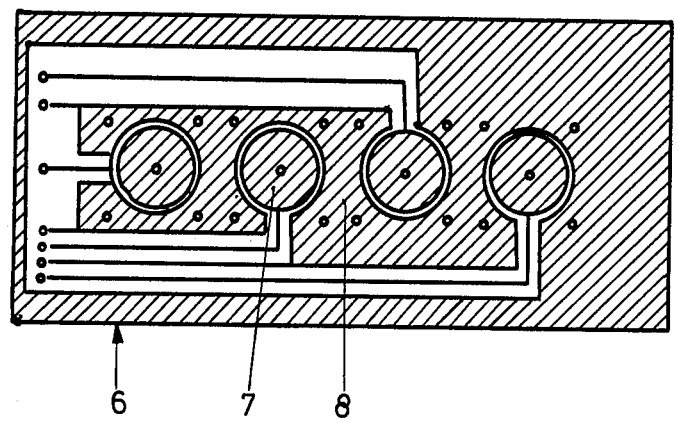

The example of embodiment of an ultrasonic transducer 1 displays a disc-shaped counter-electrode 2, which is fastened on to a conductor plate 6, for example by glueing. The surface of the counter-electrode 2 can be constructed in usual manner, encircling grooves can for example be provided. A spigot 4 on the underside of the counter-electrode 2 is conducted through a bore in the conductor plate 6. Resting on the counter-electrode 2 is a synthetic material film 5, which is metallised on one side and held by a clamping ring 3, which encompasses the counter-electrode 2 and is fastened by screws 11 on the conductor plate 6.

The conductor plate 6 is electrically conductively coated on both sides. Different, mutually independent conductor track portions are formed by etching in known manner. Provided in that case on the upper side of the plate are conductor track portions 9 and 10, which are electrically insulated from one another, while the counter-electrode 2 rests on the conductor track portions 10. Thereagainst, the clamping ring 3 with the synthetic material film 5 metallised on one side rests on the conductor track portion 9. Conductor track portions 7 and 8 are provided on the underside of the conductor plate 6, wherein the counter-electrode 2 stands in connection through the spigot 4 with the conductor track portion 7. Expediently, the connection is produced by a soldering point. The conductor track portion 8 stands in connection through the screws 11 with the clamping ring 3, the synthetic material film 5 and the conductor track portion 9. The conductor track portions 7 and 8 on the underside of the conductor plate 6 serve as connecting lines for the ultrasonic transducer 1. The remaining surface of the conductor plate 6 is coated by the conductor track portion 9. The surface of the entire arrangement, i.e. of the conductor plate 6 and that of the ultrasonic transducer 1, is thus electrically conductive so that interferences in consequence of electrical charges possibly arising through friction are excluded.

The dimensions of such an ultrasonic transducer let themselves be kept very small. It can in particular be constructed to be very flat, wherein a total thickness, i.e. the thickness of ultrasonic transducer 1 and conductor plate 6 together, of less than 3 millimeters lets itself be attained very easily. The electrical properties in respect of frequency response and on and off transient behaviour in that case correspond at least to the values of conventional equipment.

Figure 5:
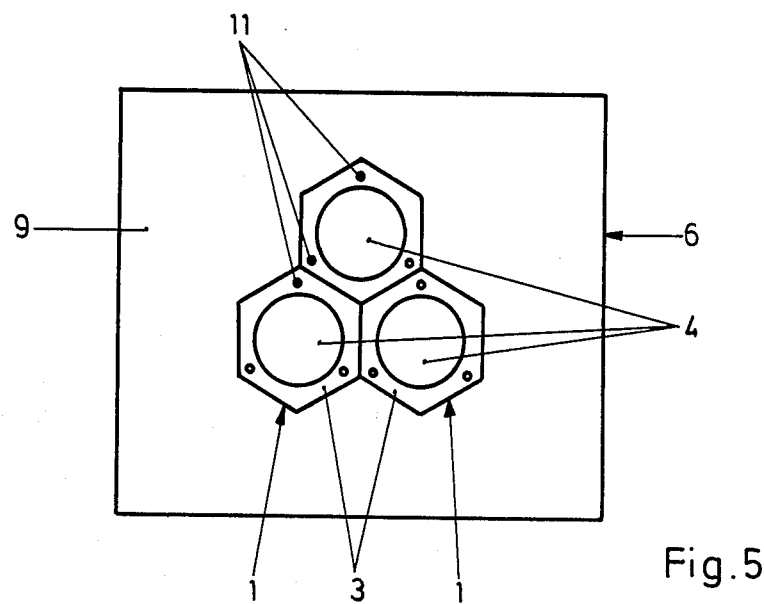

Several ultrasonic transducers 1 let themselves be arranged in simple manner on one conductor plate 6. They can in that case be aligned into one row, for which the clamping rings 3 are expediently constructed to be rectangular, as is perhaps illustrated in FIG. 1. Should a greater area be covered, hexagonal clamping rings 3 can also be used, as they are illustrated in FIG. 5, whereby a particularly close arrangement is made possible. The conductor plate is expediently executed in several layers so that also a great number of conductor track portions lets itself be accommodated in space-saving manner. The ultrasonic transducers 1 let themselves be connected together into groups on the conductor plate 6, wherein for example the clamping rings 3 and thereby the synthetic material films 5 stand in connection one with the other among one another through the conductor track portions 9 on the upper side of the conductor plate 6. The conductor track portions 7 for the connections of the counter-electrodes 2 are so arranged that the supply lines of two adjacent ultrasonic transducers 1 do not lie beside each other. Mutual interferences are avoided in this manner.

Special mountings and current feeds are not required for the ultrasonic transducers 1, since both tasks are taken over by the conductor plate 6. This also lets itself be applied very easily to surfaces, for example with the aid of adhesive strips. On the use of a flexible, bendable plate, the surfaces can also be curved so that the ultrasonic transducers let themselves be mounted for example also on the cylindrical surfaces within a jet power plant.

Other embodiments are likewise feasible; particularly, the number of ultrasonic transducers 1 on the conductor plate 6 lets itself be varied. Beyond that, also the shape of the clamping rings 3 as well as of the counter-electrode 2 can be modified.

We claim:

1. Ultrasonic measurement transducer in form of an electrical capacitor for measurements of a flow field, comprising: a counter-electrode and a film lying thereon; said film comprising synthetic material metallized on one side; a clamping ring for holding said film, said counter-electrode and film of synthetic material being arranged electrically insulated from each other; a conductor plate with conductor track portions, said counter-electrode and said clamping ring holding said synthetic material film electrically insulated therefrom being fastened to said conductor plate and being electrically connected conductively with a respective conductor track portion provided on said conductor plate.

2. Ultrasonic transducer according to claim 1, wherein said counter-electrode is disc-shaped and rests flatly on said conductor plate.

3. Ultrasonic transducer according to claim 1, wherein said counter-electrode is formed of synthetic material and has electrically conductive zones at least at the surface of said counter-electrode.

4. Ultrasonic transducer according to claim 1, wherein said counter-electrode is adjustably held by screws seated in the conductor plate.

5. Ultrasonic transducer according to claim 1, wherein said clamping ring is detachably connected with said conductor plate so that said synthetic material film is interchangeable.

6. Ultrasonic transducer according to claim 1, wherein said conductor plate is built up in several layers, said conductor track portions being arranged in different planes on and within said conductor plate.

7. Ultrasonic transducer according to claim 1, wherein said conductor plate is flexible and bendable.

8. Ultrasonic transducer according to claim 1, wherein a plurality of ultrasonic transducers each with own conductor track portions for current supply being arranged on said conductor plate.

9. Ultrasonic transducer according to claim 8, wherein said ultrasonic transducers are connected together in groups on said conductor plate.

10. Ultrasonic transducer according to claim 8, wherein conductor track portions of mutually adjacent ultrasonic transducers are not conducted beside each other.

11. Ultrasonic transducer as defined in claim 1, including spigot means on the underside of said counter-electrode and passing through a bore in said conductor plate, said transducer measuring air flow characteristics in a wind tunnel, said clamping ring surrounding substantially said counter-electrode, said counter-electrode being substantially disc-shaped and lying flatly on said conductor plate, said counter-electrode being formed of synthetic material and having electrically conductive zones at least at the surface of said counter-electrode, said counter-electrode being adjustably held by screws extending into said conductor plate, said clamping ring being detachably connected with said conductor plate so that said synthetic material film is interchangeable, said conductor plate being built up in several layers, said conductor track portions being arranged in different planes on and within said conductor plate, said conductor plate being flexible and bendable.

12. Ultrasonic transducer as defined in claim 1, including spigot means on the underside of said counter-electrode and extending through a bore in said conductor plate, said clamping ring surrounding substantially said counter-electrode and being fastened by screws on said conductor plate, said transducer having means for measuring air flow characteristics in a wind tunnel, said transducer being free of piezoelectric means.

* * * * *